United States Patent
Hoshiyama

(10) Patent No.: US 11,491,655 B2
(45) Date of Patent: Nov. 8, 2022

(54) ALARM NOTIFICATION SYSTEM FOR ROBOT

(71) Applicant: Fanuc Corporation, Yamanashi (JP)

(72) Inventor: Teppei Hoshiyama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 487 days.

(21) Appl. No.: 16/660,272

(22) Filed: Oct. 22, 2019

(65) Prior Publication Data

US 2020/0139548 A1 May 7, 2020

(30) Foreign Application Priority Data

Nov. 2, 2018 (JP) .............................. JP2018-207642

(51) Int. Cl.
*B25J 9/16* (2006.01)
*G06N 5/04* (2006.01)
*G06F 11/07* (2006.01)

(52) U.S. Cl.
CPC ............. *B25J 9/1674* (2013.01); *B25J 9/163* (2013.01); *G06N 5/04* (2013.01); *G06F 11/0766* (2013.01)

(58) Field of Classification Search
CPC ........... G05B 2219/35291; G05B 2219/34457; G05B 19/41875; G05B 13/0265; G06N 5/04; B25J 9/1674; B25J 9/1633; B25J 9/163; B25J 9/1602; G06F 11/0766
See application file for complete search history.

(56) References Cited

U.S. PATENT DOCUMENTS

| | | | |
|---|---|---|---|
| 4,305,028 A * | 12/1981 | Kostas | B25J 3/04 318/566 |
| 5,812,408 A | 9/1998 | Karakama et al. | |
| 5,880,965 A * | 3/1999 | Nakamura | G05B 19/41865 700/175 |
| 5,923,247 A * | 7/1999 | Dowden | H04L 41/0681 340/506 |
| 5,980,082 A | 11/1999 | Watanabe et al. | |
| 2003/0042288 A1 | 3/2003 | Spear et al. | |
| 2003/0088644 A1 | 5/2003 | Ganguly et al. | |

(Continued)

FOREIGN PATENT DOCUMENTS

| | | |
|---|---|---|
| CN | 1592891 A | 3/2005 |
| CN | 1595319 A | 3/2005 |

(Continued)

*Primary Examiner* — Abby Y Lin
*Assistant Examiner* — Karston G. Evans
(74) *Attorney, Agent, or Firm* — RatnerPrestia

(57) ABSTRACT

An alarm notification system configured to assist an operator so that the operator can effectively carry out a teaching operation, etc. The alarm notification system includes: a storing section configured to, with respect to a past alarm which occurred when a program generated by a teach pendant was executed, store alarm data including a name of the program and a number of a line of the program when the alarm occurred; a judging section configured to judge as to whether or not an alarm prediction condition using the alarm data stored in the storing section is satisfied, when the program is executed again; and an alarm predicting section configured to notify the operator who is carrying out teaching of the robot of alarm information relating to the alarm, when the alarm prediction condition is satisfied.

9 Claims, 4 Drawing Sheets

(56) References Cited

U.S. PATENT DOCUMENTS

| | | | |
|---|---|---|---|
| 2004/0138783 A1* | 7/2004 | Watanabe | B25J 9/1674 |
| | | | 700/259 |
| 2005/0055126 A1 | 3/2005 | Genma et al. | |
| 2009/0125139 A1 | 5/2009 | Endo et al. | |
| 2010/0251033 A1 | 9/2010 | Bay et al. | |
| 2010/0305758 A1* | 12/2010 | Nishi | G05B 19/409 |
| | | | 318/568.14 |
| 2013/0073092 A1* | 3/2013 | Hosek | G06F 3/0346 |
| | | | 700/264 |
| 2015/0198945 A1 | 7/2015 | Liang et al. | |
| 2017/0212483 A1 | 7/2017 | Tanaka et al. | |
| 2017/0308376 A1* | 10/2017 | Barsness | G06F 8/443 |
| 2018/0005132 A1* | 1/2018 | Singh | G05B 23/0283 |
| 2018/0157226 A1* | 6/2018 | Okuda | G05B 19/4061 |
| 2018/0286206 A1 | 10/2018 | Kuramoto | |
| 2019/0145863 A1* | 5/2019 | Sato | G01M 99/005 |
| | | | 702/183 |
| 2019/0188929 A1* | 6/2019 | Litovtchenko | B60W 50/0205 |

FOREIGN PATENT DOCUMENTS

| | | | |
|---|---|---|---|
| CN | 101436054 A | 5/2009 | |
| CN | 101898318 A | 12/2010 | |
| CN | 106468904 A | 3/2017 | |
| CN | 106997192 A | 8/2017 | |
| CN | 108337914 A | 7/2018 | |
| DE | 102007054608 A1 | 5/2009 | |
| DE | 102015000227 A1 | 7/2015 | |
| EP | 2998894 A1 | 3/2016 | |
| JP | 62-118402 | 5/1987 | |
| JP | 01092081 A | 4/1989 | |
| JP | 07303966 A | 11/1995 | |
| JP | 09076182 A | 3/1997 | |
| JP | 2000-207008 A | 7/2000 | |
| JP | 2016-107379 A | 6/2016 | |
| JP | 2016221582 A | 12/2016 | |
| JP | 2017100204 A | 6/2017 | |
| JP | 6358401 B1 * | 7/2018 | G05B 23/02 |

* cited by examiner

ALARM NOTIFICATION SYSTEM FOR ROBOT

CROSS-REFERENCE TO RELATED APPLICATIONS

This application is a new U.S. patent application that claims benefit of Japanese Patent Application No. 2018-207642, dated Nov. 2, 2018, the disclosure of this application is being incorporated herein by reference in its entirety for all purposes.

BACKGROUND OF THE INVENTION

1. Field of the Invention

The preset invention relates to an alarm notification system having a function to previously notifying an operator of an alarm relating to a robot.

2. Description of the Related Art

In a conventional robot system including a robot operated by executing a program, it is a well-known technique to, when an operational error of the robot or an abnormality of a servo system occurs, display an alarm on a CRT, etc., and indicate where in the program the alarm occurs (e.g., see JP S62-118402 A).

Further, also in an NC machine tool operated by executing a program, it is a well-known technique to, when a tool interferes with a workpiece, output an alarm, suspend the program, and register a program line where the interference occurs (e.g., see JP 2000-207008 A).

On the other hand, in a recent robot system, a technique regarding augmented reality (AR) (for example, an AR-compatible display) is used, in order to display the status of the robot or assist (or navigate) the work of the operator. Further, it is well-known to, when an abnormality occurs in a part (e.g., a servomotor) of the robot, highlight the part by emitting light therefrom (e.g., see JP 2016-107379 A).

In a teaching operation for a robot, a program which is previously generated off-line or is generated by an operator by operating a teach pendant, is executed to move the robot program and check the motion of the robot. In many cases, when an alarm is output based on an abnormality which occurs due to interference between the robot and peripherals or a communication error, the operator corrects a portion (or line) of the program where the abnormality occurs, by input operation to the teach pendant. However, the operator may not properly correct the program, or may forgot to correct the program, whereby the same result (i.e., the similar alarm is generated at the same program line as the past) may be obtained. Due to this, an accident or useless work may be generated.

SUMMARY OF THE INVENTION

One aspect of the present disclosure is an alarm notification system comprising: a storing section configured to, with respect to a past alarm which occurred when a program for operating a robot was executed, store alarm data including a name of the program and a number of a line of the program when the alarm occurred; a judging section configured to judge as to whether or not an alarm prediction condition using the alarm data stored in the storing section is satisfied, when the program is executed again; and an alarm predicting section configured to notify an operator who is carrying out teaching of the robot of alarm information, when the alarm prediction condition is satisfied.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
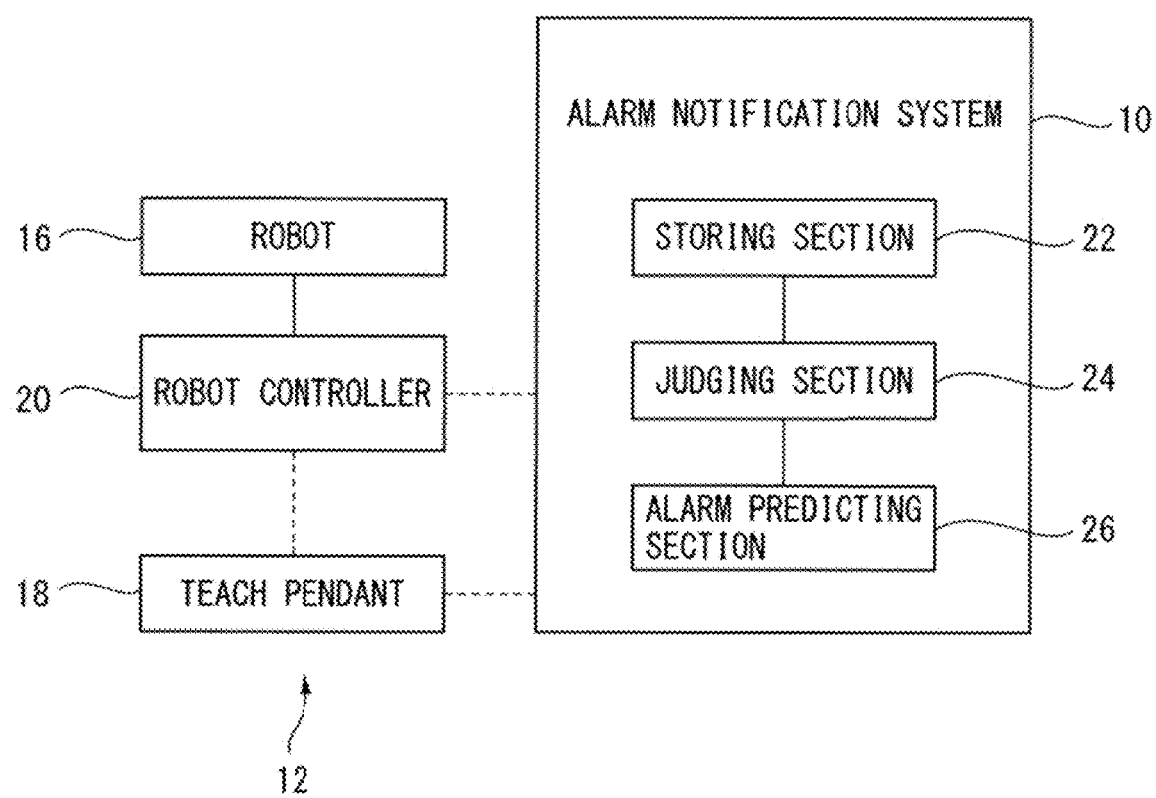
FIG. 1 is a functional block diagram of a robot system and an alarm notification system according to a preferred embodiment.
Figure 2:
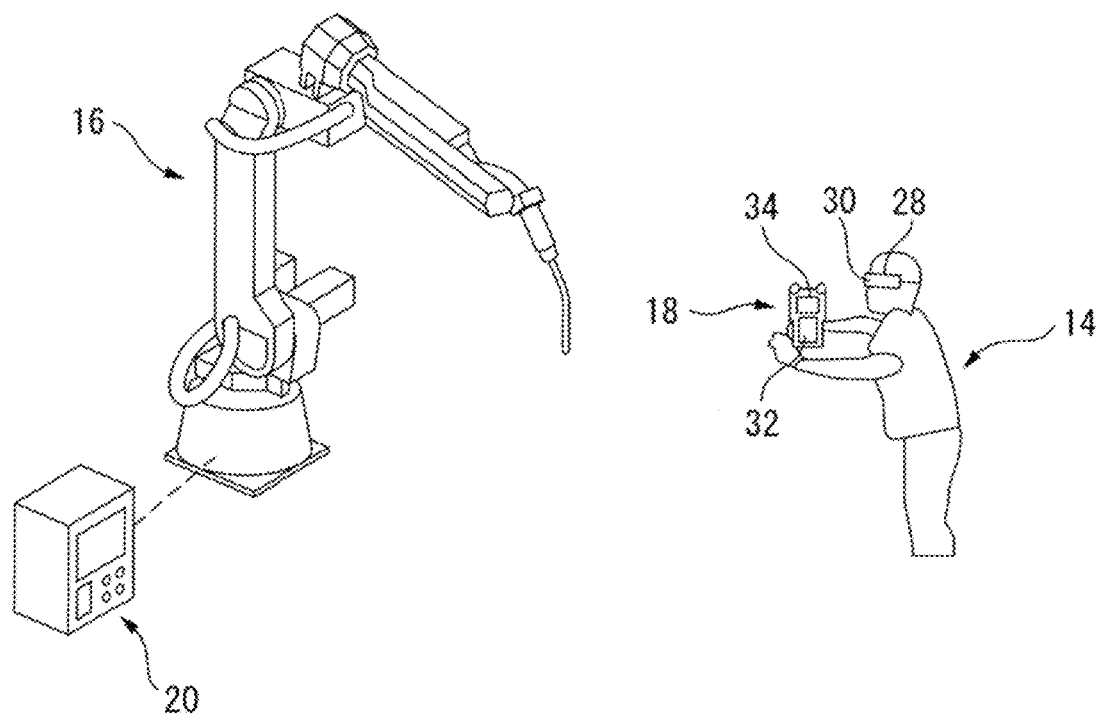
FIG. 2 shows a state in which an operator carries out teaching of a robot.

FIG. 1 is a functional block diagram showing an example of a configuration of an alarm notification system 10 according to a preferred embodiment, and a robot system 12 to which alarm notification system 10 can be applied. FIG. 2 shows a state in which a teaching operator (hereinafter, also referred to as merely the operator) 14 carries out teaching of a robot 16. Robot system 12 includes robot 16 operated by executing a robot program (hereinafter, also referred to as merely the program), a teach pendant 18 configured to generate the program based on an operation by operator 14, and a robot controller 20 configured to control the motion of robot 16 by executing the program. In the example of FIG. 2, robot 16 is a multi-joint robot having a plurality of axes, whereas robot 16 is not limited as such, as long as the robot can be controlled or operated by the program.

Alarm notification system 10 has: a storing section 22 (such as a memory or database) configured to, with respect to a past alarm which occurred when the program generated by teach pendant 18 was executed, store alarm data including a name of the program (code) and a number of a line of the program when the alarm occurred; a judging section 24 (such as a processor or CPU) configured to judge as to whether or not an alarm prediction condition using the alarm data stored in storing section 22 is satisfied, when the program is executed again; and an alarm predicting section 26 configured to notify operator 14 who is carrying out teaching of robot 16 of alarm information relating to the alarm, when the alarm prediction condition is satisfied.

In the embodiment, alarm predicting section 26 is configured to visually, aurally or haptically output the alarm information. In the example of FIG. 2, alarm predicting section 26 is a display screen 30 of an augmented-reality (AR) compatible device 28. For example, AR compatible device 28 is a wearable head-mounted device such as an AR glass, or a portable operation panel such as a tablet. In the example of FIG. 2, AR compatible device 28 is the head-mounted device having a transmissive display as display section 30.

AR compatible device 28 is configured to display the information generated by a computer, etc., so that the information is overlapped with an actual environment (such as a factory or a work field) including robot 16. By virtue of this, the operator can obtain various information relating to a status of the robot, etc., while watching the actual robot.

The function of the augmented reality (AR) may be conventional as described in JP 2016-107379 A, and thus the detailed explanation thereof is omitted.

Optionally, alarm notification system 10 may have an inputting section 32 which operator 14 can operate, so that operator 14 can select or designate the type of the alarm to be notified to operator 14 by alarm predicting section 26. For example, a ten key or a touch panel of teach pendant 18 may be used as inputting section 32. Alternatively, inputting section 32 may be provided to robot controller 20 as a ten key or a touch panel, robot controller 20 being configured to control robot 16 based on the program generated by teach pendant 18. Further, storing section 22 and judging section 24 as described above may be arranged in robot controller 20 or teach pendant 18.

Teach pendant 18 may have a display screen 34 which is used when operator 14 carries out teaching operation. In this regard, the same content as the alarm information to be notified to operator 14 by alarm predicting section 26 may also be displayed on display screen 34. By virtue of this, the possibility that operator 14 overlooks the alarm prediction can be further reduced. Teach pendant 18 may be a dedicated device for the teaching of robot 16, whereas teach pendant 18 may be an all-purpose (or commercially available) electronic device such as a tablet or smartphone, having a function (or software) for the teaching therein.

Figure 3:
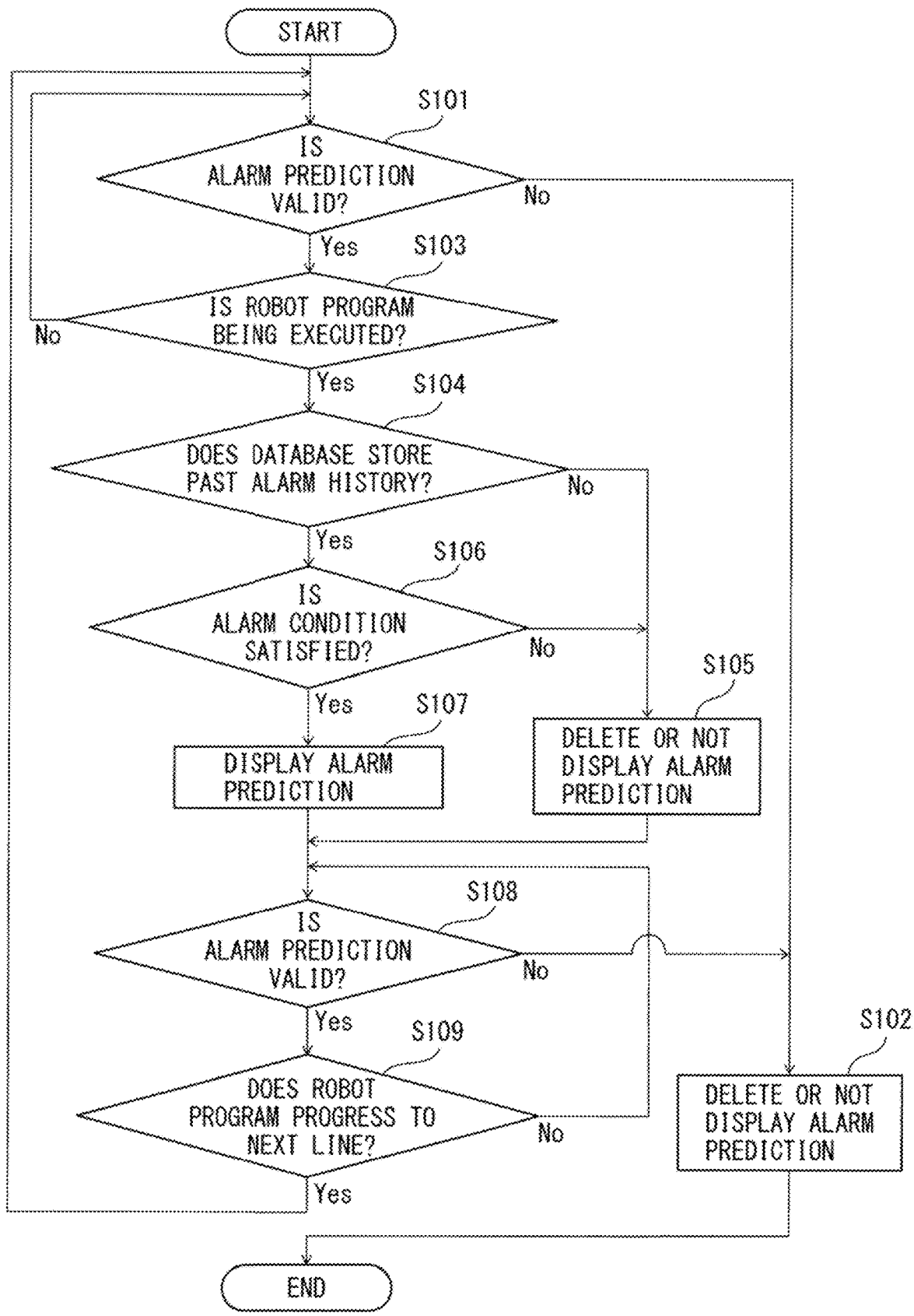
FIG. 3 is a flowchart showing an example of a procedure in the alarm notification system.

Hereinafter, an example of a procedure in alarm notification system 10 will be explained, with reference to a flowchart of FIG. 3. First, in step S101, it is judged by using a processor such as judging section 24, as to whether an alarm prediction is previously set as "valid" or "invalid". For example, when operator 14 considers that the alarm prediction is not necessary in the teaching operation and sets the alarm prediction as invalid by using inputting section 32, etc., of teach pendant 18, the procedure progresses to step S102, in which the alarm prediction is not executed. Concretely, an indication relating to the alarm prediction is hidden, or deleted when the alarm prediction has been valid before the alarm prediction is set as invalid. In this case, operator 14 carries out normal teaching operation in which the alarm prediction is not executed.

On the other hand, when the alarm prediction is judged as valid in step S101, the procedure progresses to step S103, in which it is judged by judging section 24, etc., as to whether the program of robot 16 is being executed or not. When the program is not being executed, it is not necessary to execute the alarm prediction, and thus the procedure is returned to step S101.

When the robot program is being executed in step S103, the procedure progresses to step S104, in which judging section 24, etc., with respect to the program in execution, judges as to whether or not storing section 22 such as the database stores a history of the alarm when the program was executed in the past (concretely, the past alarm data including the name of the program associated with the line number of the program when the alarm occurred). When storing section 22 does not store the alarm data, an object of the alarm prediction does not exist, and thus the procedure progresses to step S105 so that the similar process to step S102 (deleting or hiding the alarm prediction) is executed. In this regard, the name of the program may be information by which (a code of) the program can be identified. For example, the program name is not limited to a text, and may be constituted only by a sign and/or a number.

When storing section 22 stores the alarm data in step S104, the procedure progresses to step S106, in which judging section 24, etc., judges as to whether or not an alarm prediction condition using the alarm data is satisfied. For example, the alarm prediction condition is that the program line in execution is at latest immediately before (preferably, 2-5 lines before) the line of the program when the alarm occurred in the same program executed in the past. In many cases, the alarm prediction condition is a temporal condition (or major condition) that the program line where the alarm occurred in the past will be executed within several seconds or several tens of seconds. The operator may previously carry out a setting (concretely, designate the number of program lines), e.g., wherein the alarm prediction is executed when the program line in execution is 3 lines before the program line where the alarm occurred in the past. In this regard, when the robot program is not always executed in the order of program line number by using a subroutine, etc., it may be judged as to how many lines the line in execution is before the line where the alarm occurred in the past, based on the order in which the program is actually executed.

Optionally, a sub-condition other than the above temporal condition may be set, and the alarm prediction may not be executed when the sub-condition is not satisfied. For example, when a type of the alarm to be predicted is the same as a type of the alarm which is previously designated (e.g., input to the teach pendant) by the operator, the alarm prediction may be executed. On the other hand, when the type of the alarm to be predicted is different from the designated type of the alarm, the alarm prediction may not be executed even if the time when the program line where the alarm occurred in the past is executed is getting close. As the type of the alarm, an interference between the robot and a peripheral, a possibility that the movable part (each axis) of the robot reaches a singular point, and a communication error between at least two of robot 16, robot controller 20, teach pendant 18 and the other equipment, may be used. By virtue of this, operator 14 can recognize the prediction relating to only the alarm which is previously designated and particularly to note, whereby the concentration of the operator can be prevented from decreasing due to the frequent alarm prediction.

As another example of the sub-condition, a number of occurrences of the alarm which occurred in the past may be used. For example, even if the temporal condition is satisfied (i.e., the program line where the alarm occurred in the past is getting close), when the number of occurrences of the alarm at the line where the alarm occurred in the past is smaller than a threshold (e.g., three) which is previously designated (e.g., input to the teach pendant) by the operator, the alarm prediction may not be executed, whereas the alarm prediction may be executed when the number of occurrences of the alarm is equal to or larger than the threshold. By virtue of this, the operator can recognize the prediction relating to only the program line where the same alarm occurred many times, whereby the operator can effectively correct the program. In addition, the sub-condition relating to the type of the alarm and the sub-condition relating to the number of occurrences of the alarm may be simultaneously set.

In step S106, when the alarm prediction condition including the sub-condition is satisfied, the procedure progresses to step S107, wherein the alarm prediction is executed to operator 14, so as to notify that the program line where the alarm occurred in the past is getting close.

Figure 4:
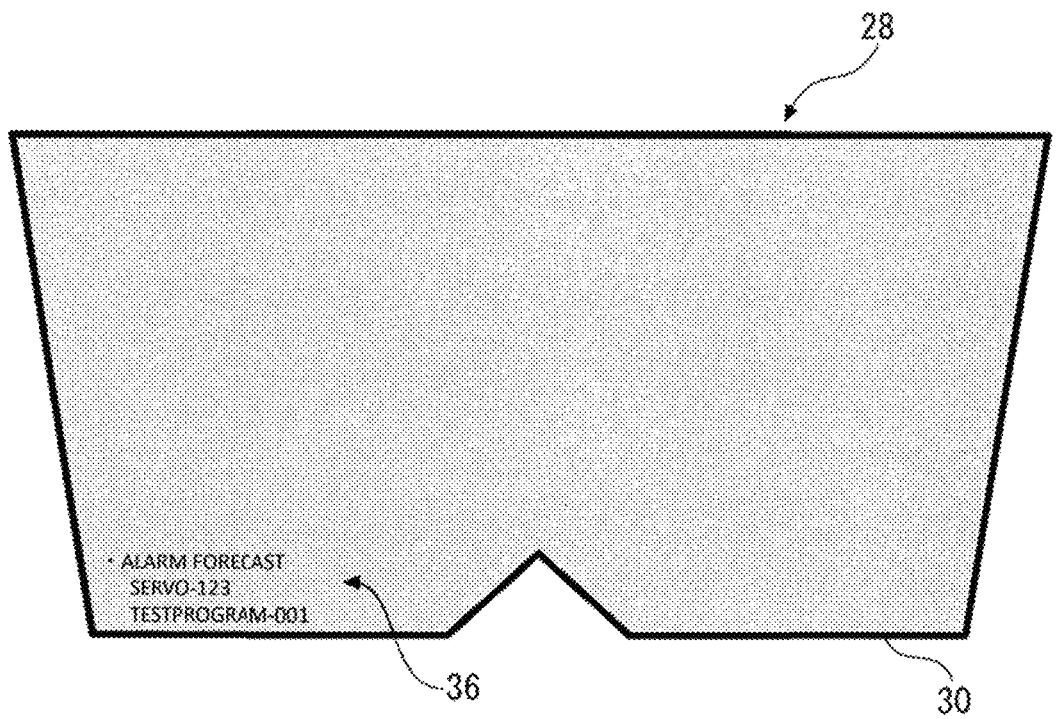
FIG. 4 shows a display example of an alarm prediction.

FIG. 4 shows an example in which the alarm prediction is displayed so that the operator can visually recognize the alarm prediction. As exemplified in FIG. 2, when operator 14 wears AR-compatible device 28 such as an AR glass, an image (or text) as indicated by reference numeral 36 may be displayed on a part (in the drawing, a left-lower portion) of displaying section 30. As the information relating to the alarm, an indication ("ALARM FORCAST") representing that the line where the alarm occurred in the past is getting close, the name (or type) of the alarm (in this case, an abnormality of a motor), the name of the program, and the line number where the alarm occurred in the past, may be displayed as the alarm prediction. Also, at least one of them may be displayed. By virtue of this, during the operator is carrying out the operation such as teaching while looking at the robot, the operator can visually recognize that the program line where the alarm occurred in the past is getting close. Further, if necessary, the operator can stop the motion of the robot and take appropriate measure (e.g., correct the program), so that the alarm does not occur.

Figure 5:
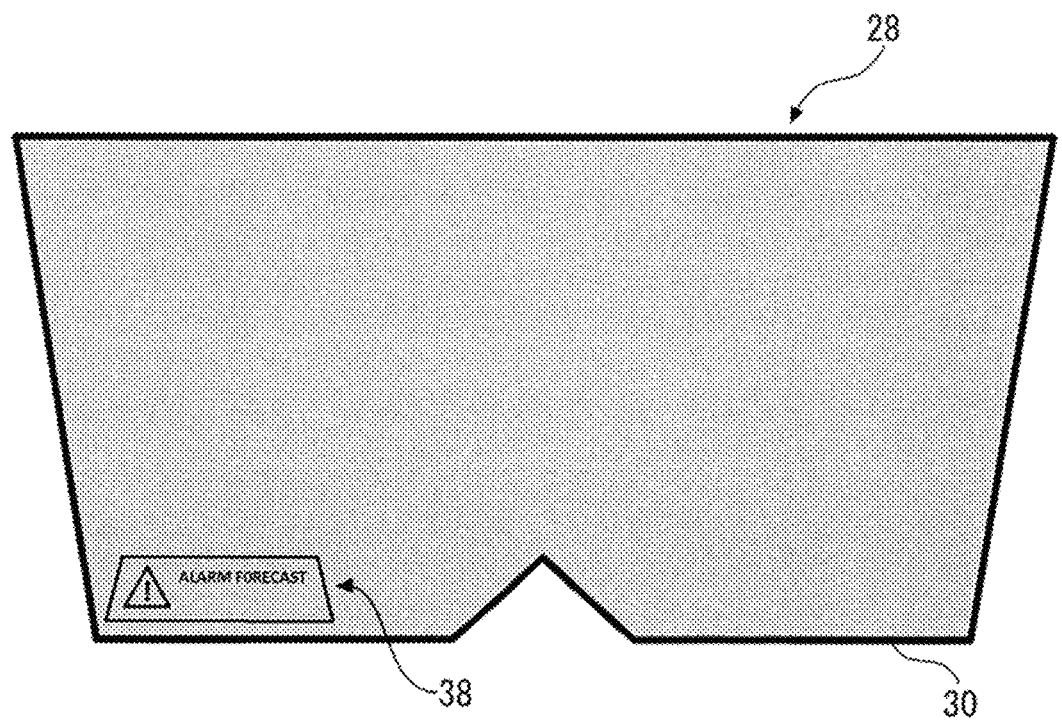
FIG. 5 shows another display example of the alarm prediction.

FIG. 5 shows another example in which the alarm prediction is displayed so that the operator can visually recognize the alarm prediction. In the example of FIG. 5, instead of alarm prediction 36 as shown in FIG. 4, an image (or text) as indicated by reference numeral 38 may be displayed. Alarm prediction 38 of FIG. 5 notifies the operator only that the program line where the alarm occurred in the past is getting close, and thus an amount of information which the operator can obtain is smaller than that of FIG. 4. However, due to such a display manner, the operator can recognized that the line where the alarm occurred in the past is getting close, during the operator is carrying out the operation such as teaching while looking at the robot.

In addition to or instead of the alarm prediction as explained above, an audible or haptic means may be used as the alarm prediction. For example, the fact that the line where the alarm occurred in the past is getting close, the type of the alarm, and/or the number of the line where the alarm occurred may be output by sound by using a speaker, etc., arranged on the AR-glass or near the operator. Alternatively or additionally, the operator can recognize that the line where the alarm occurred in the past is getting close by vibrating the AR-glass or the teach pendant. When using the vibration, the operator can be notified of a concrete content of the alarm, by changing the intensity or a pattern (e.g., continuous or intermittent) of the vibration.

With reference to FIG. 3 again, the setting of the alarm prediction explained in step S101 may be changed by the operator at an arbitrary timing. Thus, after step S105 or S107, step S108 similar to step S101 may be added. For example, even if the alarm prediction is valid in step S101, when the alarm prediction is set as invalid by the input operation of the operator after that, the procedure progresses from S108 to S102.

When the alarm prediction is judged to be valid in step S108, the procedure progresses to step S109, in which judging section 24 judges whether or not the line of the robot program in execution is after the line where the alarm occurred in the past. If the program line where the alarm occurred in the past has already been executed, the procedure is returned to step S101. On the other hand, the program line where the alarm occurred in the past has not been executed or is in execution, the procedure is retuned before step S108.

In the present disclosure, the name or the line number of the program executed when the alarm occurred in the past teaching operation may be associated with the type of the alarm and stored. Then, when the same program (including the program corrected by the operator in view of the alarm, etc.) is executed and the program line where the alarm occurred in the past is getting close, the alarm prediction (e.g., displaying an icon or list of the alarm which occurred in the past on the AR-compatible device) may be automatically executed, and thus the teaching operator can be notified of the content of the alarm prediction. In other words, the alarm prediction may serve as a reminder for the operator, whereby the operator can take appropriate measures (e.g., can safely stop the robot at an appropriate timing for the operation) before the same failure occurs, and thus the teaching operation can be effectively carried out.

In many cases, the teaching operator carefully look at the robot during the program is in execution, and thus the operator may overlook the alarm prediction when it is displayed on the teach pendant. However, by virtue of the alarm prediction by using the AR-compatible device, the operator can recognize the alarm prediction even when looking at the robot, whereby the operator can be assuredly notified of the alarm prediction. In addition, the alarm notification system of the present disclosure may be used not only when the teaching operation is carried out, but also when the motion of the robot or interference between the robot and the other object is checked.

According to the present disclosure, during the robot program is executed, the operator can previously recognize the information relating to the alarm which occurred when the same program was executed in the part. Therefore, the operator can take appropriate measures before the same alarm occurs, whereby operating efficiency can be significantly improved. Further, when the operator carries out the teaching operation, etc., while using the AR-compatible device, the operator can recognize the alarm information while looking at the robot, whereby usability of the alarm notification system may be further improved.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An alarm notification system comprising:
a memory device configured to, with respect to a past alarm which occurred when a first program for operating a robot was executed, store past alarm data including a name of the first program and a number of a line of the first program when the past alarm occurred in the past; and
a processor configured to predict an occurrence of a predicted alarm based on an alarm prediction condition:
when a second program is executed, judge as to whether or not the alarm prediction condition using the alarm data stored in the memory device is satisfied, wherein the alarm prediction condition is satisfied when the processor determines that:
the memory device stores the past alarm data of the first program when the past alarm occurred in the past,
the second program is the same as the first program, and
the second program line in execution by the processor is a line in execution before the stored number of the line of the first program when the past alarm occurred in the first program,
when the alarm prediction condition is satisfied, notify an operator who is carrying out teaching of the robot of alarm information, and
when the alarm prediction condition is not satisfied, do not notify the operator who is carrying out teaching of the robot of alarm information.

2. The alarm notification system as set forth in claim 1, wherein the alarm prediction condition is that the program line in execution is at latest immediately before the line of the program when the alarm occurred in the same program executed in the past.

3. The alarm notification system as set forth in claim 2, wherein the alarm prediction condition is that a type of the alarm relating to the alarm information notified by the processor is the same as a type of an alarm which is previously designated by the operator.

4. The alarm notification system as set forth in claim 2, wherein the alarm prediction condition is that a number of occurrences of the alarm at the line of the program where the alarm occurred in the past is equal to or larger than a threshold which is previously designated by the operator.

5. The alarm notification system as set forth in claim 1, further including a display of an augmented-reality compatible device.

6. The alarm notification system as set forth in claim 5, wherein the augmented-reality compatible device is a head-mounted device having a transmissive display as the display.

7. The alarm notification system as set forth in claim 1, wherein the alarm information includes at least one of: the name of the program; the type of the alarm; and the line number of the program where the alarm occurred.

8. The alarm notification system as set forth in claim 1, further comprising an inputting device which the operator can operate, so that the operator can designate the type of the alarm to be notified to the operator by the processor.

9. The alarm notification system as set forth in claim 1, wherein a display screen configured to display the alarm information is provided to a teach pendant which is used when the operator carries out teaching of the robot.

* * * * *